Sept. 13, 1966  C. W. HATCHER  3,272,560
CONCRETE BUMP CUTTER WITH CARRIAGE LEVEL ADJUSTMENT
Filed June 6, 1963  5 Sheets-Sheet 1
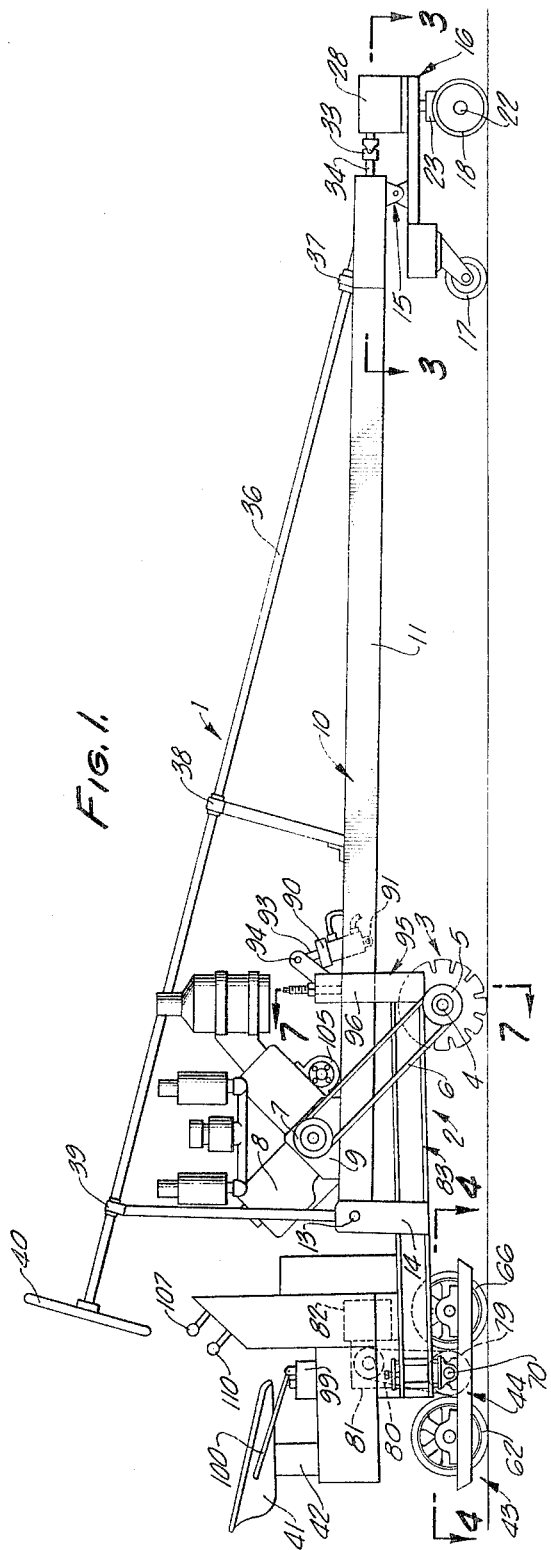
INVENTOR.
CECIL W. HATCHER
BY W. E. Beatty
ATTORNEY

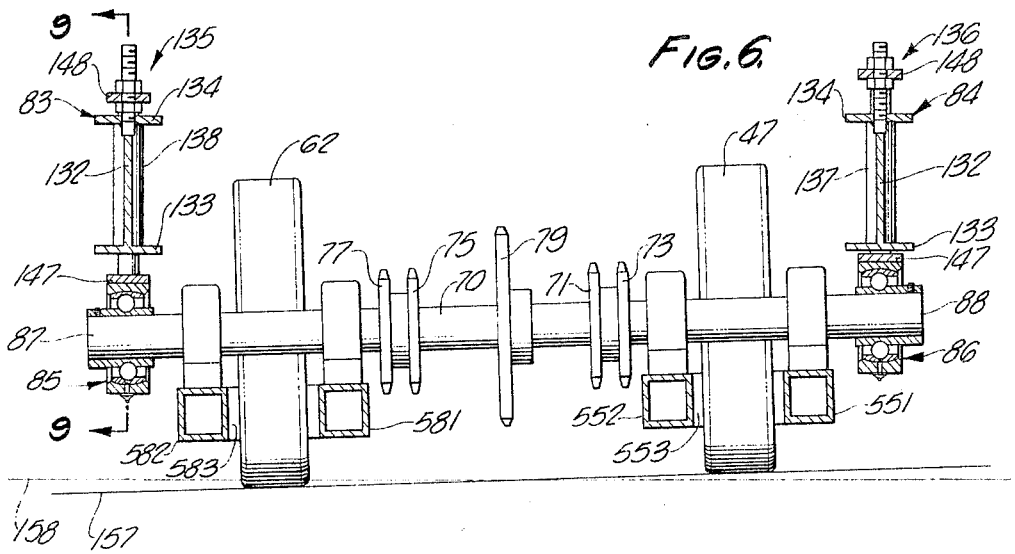
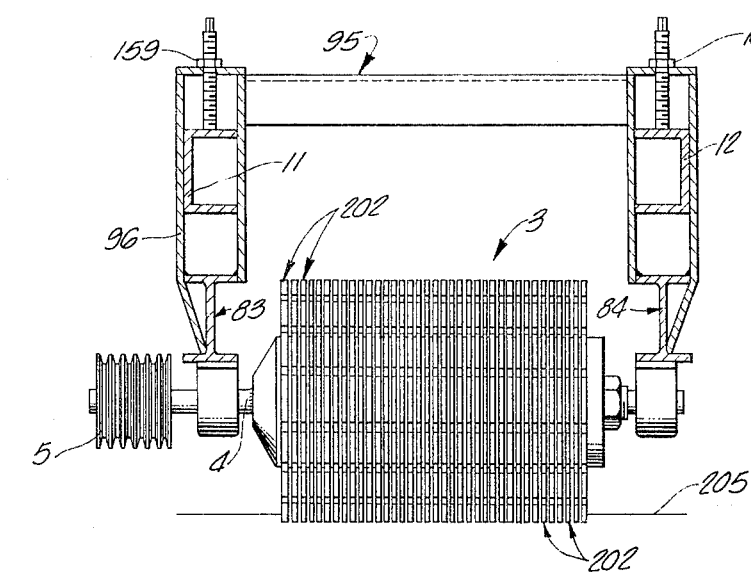
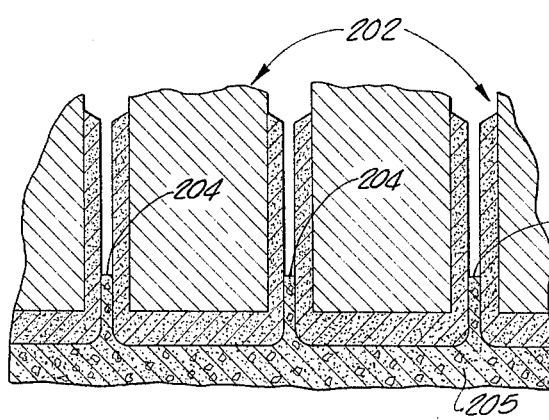
FIG. 6.
FIG. 7.
FIG. 8.
INVENTOR.
CECIL W. HATCHER

INVENTOR.
CECIL W. HATCHER

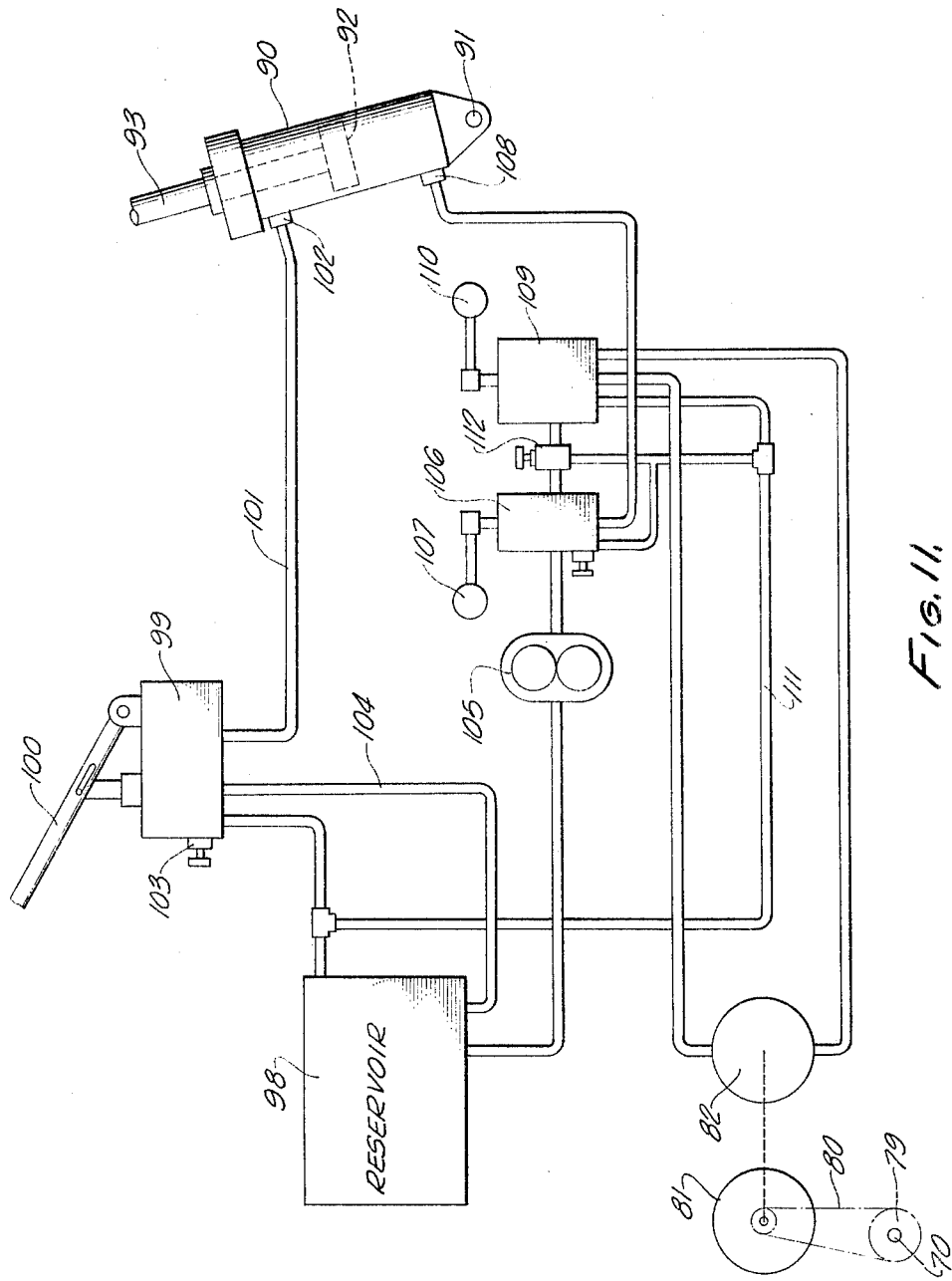

United States Patent Office 3,272,560
Patented Sept. 13, 1966

3,272,560
CONCRETE BUMP CUTTER WITH CARRIAGE
LEVEL ADJUSTMENT
Cecil W. Hatcher, West Covina, Calif., assignor to Concut
Inc., El Monte, Calif., a corporation of California
Filed June 6, 1963, Ser. No. 286,031
9 Claims. (Cl. 299—39)

The invention relates the a concrete bump cutter with carriage level adjustment, and more particularly, it relates to a self-propelled vehicle having rotatable abrasive wheels for removing bumps from concrete paving such as aircraft landing fields, floors, and the like.

The invention is an improvement on the earlier form of bump cutter disclosed and claimed in several prior patents and applications noted below.

The present patent application discloses several features which are disclosed and claimed in other pending applications as indicated below:

In U.S. Patent No. 3,007,687, Nov. 7, 1961, the sensitivity of the machine is reduced to relatively minor irregularities of the surface of the paving by supporting the cutter, for height adjustment, on an elongated frame having a wheel support at a longer distance from the cutter than its vehicle support, whereby the variation in the height of the cutter is only a fraction of the variation in the height of the outer end of such elongated frame as its front wheel rides over the paving.

In U.S. Patent No. 3,037,755, June 5, 1962, the invention is directed to an arrangemet wherein the rear of the vehicle frame is pivotally connected to a truck having front and rear wheels which in fact are driving wheels, the truck thus acting as a rear extension frame somewhat of the same general nature as the front extension frame, to reduce the vertical motion at the rear of the vehicle frame in proportion to the lever arms between the front and rear wheels of the truck and the truck pivot.

In U.S. Patent No. 3,087,712, April 30, 1963, the invention is directed to an improved remote steering control for the self-powered cutting machine.

Co-pending application S.N. 150,039, filed November 3, 1961, now Patent No. 3,195,957, issued July 20, 1965, discloses and claims a further reduction of the effects of bumps by providing a truck frame at each side of the rear of the vehicle, the rear of the vehicle frame being supported on the drive shaft of the truck. Divisions A and B of this patent application were filed April 11, 1963. Division A is S.N. 272,413, now Patent No. 3,201,173, issued August 17, 1965, and discloses and claims the feature of a front truck, the front end of the extension frame having a hinge connection with the front truck intermediate its caster wheel and steering wheel. Division B is S.N. 272,414, now Patent No. 3,208,796, issued September 28, 1965, and discloses and claims the feature of means for supplying fluid to one end of a hydraulic cylinder to raise the cutter and means for supplying fluid pressure to the other end of the cylinder to snub the cutter.

While making use of the features described above, an object of the present invention is to improve the height adjustment for the cutter head. More particularly, an object is to provide a 4 point support for the cutter head. The invention provides a height adjustment for each side of the rear truck in combination with the adjustment-like stop screws 66, 67 at each side of the cutter head suspension as shown in FIG. 7 of Patent 3,007,687, thereby providing a 4 point adjustment for the cutter head. The carriage level adjustment of the present invention makes it possible to (a) change the height of one side of the truck frame with respect to the other to vary the depth of cut at each side and (b) change the height at both sides to (1) vary the depth of cut or (2) adjust the slack in the chain which drives the wheels of the rear truck.

A further object is to provide an improved universal support for the rear of the main frame on the drive shaft for the rear truck.

For further details of the invention, reference may be made to the drawings wherein FIG. 1 is a view in side elevation of a bump cutter according to the present invention.

FIG. 2 is an enlarged sectional view on line 2—2 of FIG. 3.

FIG. 3 is a sectional view on line 3—3 of FIG. 1.

FIG. 6 is a sectional view on line 6—6 of FIG. 5.

FIG. 7 is a sectional view on line 7—7 of FIG. 1.

FIG. 8 is an enlarged longitudinal sectional view of the cutter head with parts broken away.

FIG. 11 is a flow diagram of the hydraulic control mechanism employed in connection with the invention.

Figure 4:
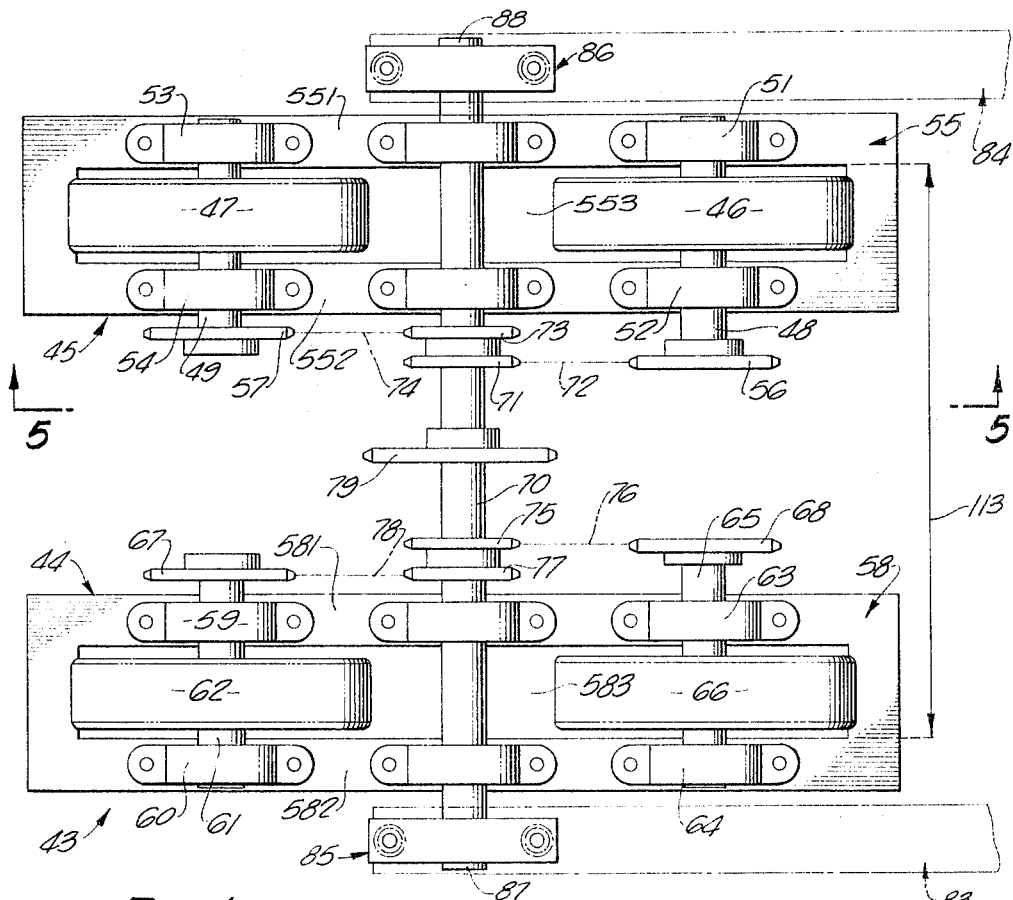
FIG. 4 is an enlarged sectional view on line 4—4 of FIG. 1.
Figure 5:
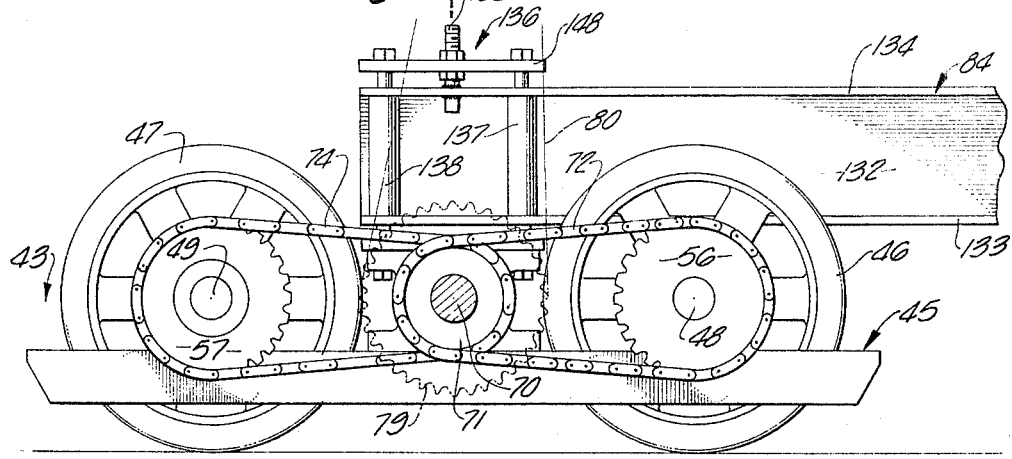
FIG. 5 is a sectional view on line 5—5 of FIG. 4.

Referring in detail to the drawings, the vehicle 1 has a vehicle or main frame 2 at the front end of which is rotatably mounted a cutter head 3 on a cutter shaft 4 having a pulley 5 connected by belt 6 to the pulley 7 on the engine 8. As shown in FIGS. 7 and 8, cutter head 3 comprises a series of abrasive discs 202 on the cutter shaft 4 with separators for leaving a series of ridges 204 in the pavement 205, or the abrasive discs may be spaced close enough to make a substantially smooth cut. If ridges are formed, they may be removed by repeating the traverse of the cutter head over the area being cut. In FIG. 1, the engine 8, as shown at 9, is mounted on the rear end of an extension frame 10. Extension frame 10, as shown in FIG. 3, has opposite arms 11 and 12, being somewhat U shaped. The rear end of the extension frame 10 has a hinge connection 13 on a horizontal axis, with an upright post 14 at each side of the vehicle frame 2, one of these posts being shown in FIG. 1 at 14.

The front end of extension frame 10 has a hinge connection 15 on a horizontal axis with the front truck 16 which has a rear caster wheel 17 and a front wheel 18 for steering. The hinge connection 15 includes suitable bearings 19 on the frame 10, the bearing 20 on the truck 16 and a hinge pin or shaft 21.

The front wheel 18 has an axle 22, see FIG. 2, carried by a bracket 23 fixed to a vertical shaft 24 having a bearing 25 on the body 26 of the truck and a further bearing 27 in a housing 28 fixed to the body 26.

The shaft 24 at its upper end has a worm wheel 29 meshing with a worm 30 rotatably supported on a horizontal axis by bearings 31 and 32 carried by the housing 28. The worm 30 is connected by a universal coupling 33 to a short steering rod section 34, the latter having a connection through the universal coupling 35 with the front end of the inclined steering rod 36. Steering rod 36 has bearing supports on the extension frame 10 as indicated at 37, 38 and 39. The rear end of extension rod 36 has a handle or steering wheel 40 accessible to an operator for whom a seat 41 is provided, this seat being mounted as shown at 42 on the vehicle frame 2.

As the front of the extension frame 10 which determines the height of the cutter head 3 as described later, is mounted by the hinge connection 15 at an intermediate point on the front truck 16, any bump encountered by the forward travel of the front wheel 18 will be reduced in its effect on the extension frame 10 in proportion to the relative distances involved between the hinge connection 15 and the wheels 17 and 18.

The effect of bumps at the rear of the machine during its forward travel, is reduced as follows:

The rear of the vehicle frame 2 is supported by a rear truck 43 which is composed of two truck members 44 and 45 arranged side by side at opposite sides of the rear of the vehicle, see FIG. 4.

Truck member 45 has front and rear driven wheels 46 and 47 having axles 48 and 49 having bearing supports 51, 52 and 53, 54 on the truck frame 55. Frame 55 has opposite sides 551, 552 and a control opening 553 for wheels 46, 47. Axle 48 has a sprocket 56 and axle 49 has a sprocket 57. Similarly, the other truck member 44 has a truck frame 58 having opposite sides 581, 582 and a central opening 583 for the wheels 62, 66. Truck frame 58 has bearings 59 and 60 for axle 61 of rear driven wheel 62, and bearings 63, 64 for the axle 65 of front driven wheel 66. Axle 61 has a sprocket 67 and axle 65 has a sprocket 68.

A drive shaft 70 extends across the middle of both of the truck members 44 and 45 having a sprocket 71 connected by chain 72 to sprocket 56, also having a sprocket 73 connected by chain 74 to sprocket 57, also having a sprocket 75 connected by a chain 76 to sprocket 68, a sprocket 77 connected by chain 78 to sprocket 67, and a central sprocket 79 connected by chain 80, see FIG. 4, to a gear box 81, see FIGS. 1 and 11, which is driven by the hydraulic motor 82. Gear box 81 and hydraulic motor 82 are mounted on the main frame 2, at the rear thereof, above the drive shaft 70.

In FIG. 4, the line 113 represents the width of the cutter head and shows that the width of the cutter head 3 in an axial direction is greater, viz., 24 inches, than the width to the outside edges of the wheels of truck 43, viz., 23 inches. The wheels of the truck 43 thus ride on the path cut by the cutter head 3.

The vehicle frame 2 has laterally spaced side arms 83 and 84, see FIG. 4, the rear ends of which are supported by universal bearings 85 and 86 on the opposite ends 87 and 88 of the drive shaft 70 which thus serve as a hinge connection for the rear end of the vehicle frame 2, at a horizontal axis intermediate the front and rear wheels of the truck members 44 and 45. Both the hinge connection just described for the rear end of vehicle frame 2 and the use of individual truck members 44 and 45 contribute to reducing the effect on the cutter head 3 of bumps encountered by the rear truck 43 as the vehicle moves in a forward direction.

As shown in FIGS. 3, 4, 6, 9 and 10, the bearings 85 and 86 are similar and are similarly adjustably connected to the respective side arms 83, 84 of the main frame. Each of the bearings 85, 86 includes the bearing shown in FIG. 10, the inner race 120 being connected to the shaft 70 by set screws 121, 122. The outer race 123 has a convex spherical periphery 124 which fits the spherical inner surface of the housing 126. The bearing has a series of balls indicated at 131 and opposite seals 127, 128. Each bearing has a hydraulic grease fitting 129 and a lock pin 130 which locates the lube hole and limits rotation of the outer bearing race 123 in the housing 126. The races 120 and 123 are self-aligning in any direction without distortion of the seals 127, 128.

Figure 9:
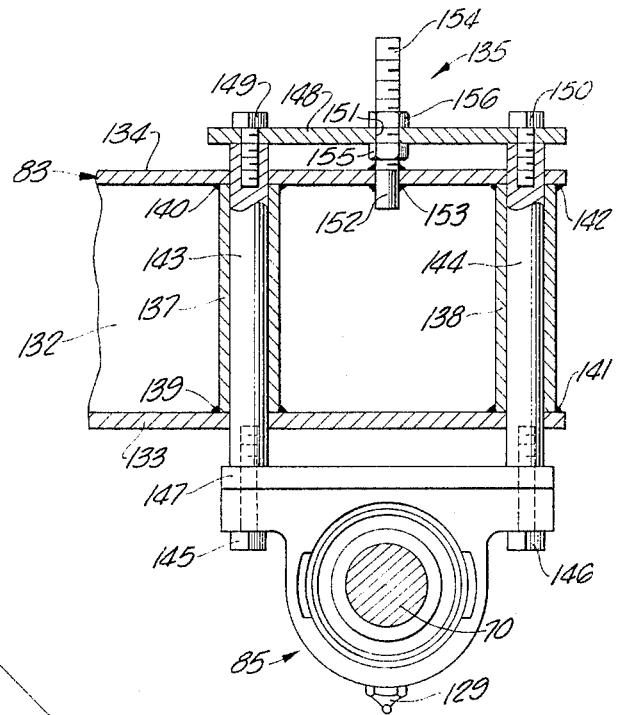
FIG. 9 is a sectional view on line 9—9 of FIG. 6.
Figure 10:
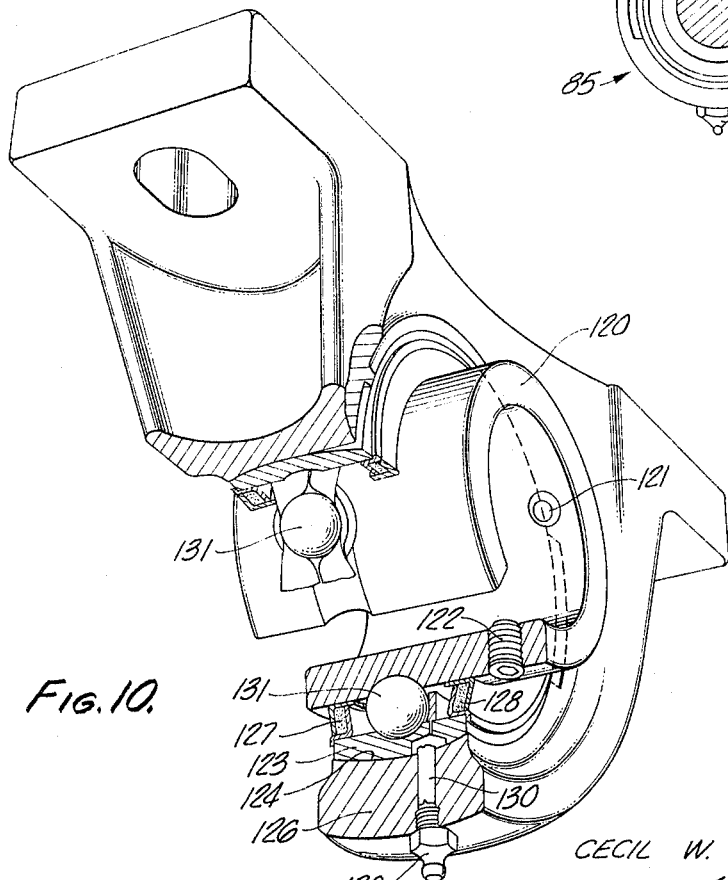
FIG. 10 is an enlarged perspective view of one of the universal bearings, with parts broken away.

While the bearing shown in FIG. 10 has been adapted to the purposes of the present invention, this bearing is a well known Sealmaster bearing made and sold by others. As shown in FIGS. 4, 6 and 9, the arms 83, 84 are in the form of an I beam, each having an upright central web 132 and end flanges 133 and 134. An adjustable stop 135 and 136 is provided for supporting each arm 83, 84 on its respective bearing 85, 86. As shown in FIG. 9, the web 132 is removed to make room for a pair of cylindrical sleeves 137 and 138 welded at their opposite ends to the flanges 133 and 134 as shown at 139 and 140 for sleeve 137 and at 141, 142 for sleeve 138. These sleeves serve as slide bearings for cylindrical slides 143 and 144 which are secured by bolts 145 and 146 at their lower ends to the base 147 of the bearing housing 126, being secured at their upper ends to a bar 148 by bolts 149 and 150. Bar 148 acts as a hanger for arm 83, having an aperture 151 through which passes a post 152 welded to flange 134 as shown at 153. Post 152 has threads 154 to receive nuts 155 and 156 which are adjustably threaded to a desired position to support the arm 83 at the required height. Thus the wheels 47, 62, see FIG. 6, may ride on the paving at one level as shown by line 157 while the cutterhead is inclined to the level 157 as shown by line 158. Or, both of the stops 135 and 136 may be operated to raise or lower both arms 83, 84 to adjust the slack in the chain 80.

As shown in FIG. 1, a hydraulic cylinder 90, see also FIG. 11 has a hinge connection 91 with the extension frame 10, and having a piston 92 and plunger 93 having a hinge conection 94 with a "U" shaped bracket 95, which has opposite vertical arms connected to the front end of the arms 83 and 84 of the vehicle frame 2. One of these arms 96 arises from the front arm 83 as appears in FIG. 1. Also, as shown in FIG. 7, the bracket 95 has spaced adjustable stops 159 and 160 to limit the downward movement of, and determine the height of the cutter head 3 as shown and described in connection with FIG. 7 of Patent 3,007,687. The stops 159 and 160 may be used to reset the height or inclination of the cutter head after or in connection with the adjustment of the stops 135 and 136 in FIG. 6.

As described in connection with FIG. 11, means are provided for supplying hydraulic pressure to the opposite ends of cylinder 90, to either raise the cutter head 3, or to use the weight of engine 8 as a buttress to snub the cutter head 3 and hold it to its work.

As shown in FIG. 11, a suitable reservoir 98 is provided for the hydraulic fluid. Hand pump 99, having operating handle 100 which is at the operator's position adjacent seat 41, see FIG. 1, supplies pressure over the line 101 to the snubber inlet 102. The adjustable relief or bleed valve 103 is provided for relief and fine control of the pressure in the line 101. Line 104 is an inlet from the reservoir 98 to pump 99.

The hydraulic gear pump 105, see FIGS. 1 and 11, is suitably driven by the engine 8, and supplies fluid under pressure for operating the hydraulic motor 82 and for raising the cutter head 3. Valve 106 having handle 107 at the operator's position adjacent seat 41, see FIG. 1, controls pressure to or from inlet 108. Valve 109 having handle 110 at the operator's position at the rear of the machine as shown in FIG. 1, controls pressure from pump 105 to motor 82 with the usual return 111 to the reservoir 98. When valve 106 is in neutral the pressure line from pump 105 is continued through relief valve 112 to the valve 109. Relief valve 112, like valve 103, provides a fine control for the fluid pressure supplied to the inlet 108.

While I have herein shown and described my invention in what I have conceived to be the most practical and preferred embodiment, it is recognized that departures may be made therefrom within the scope of my invention which is not to be limited to the details disclosed herein but is to be accorded the full scope of the claims so as to embrace any and all equivalent devices.

I claim:

1. A concrete cutting machine comprising a main frame having a forward cutter head, an extension frame having a front vehicle wheel, said extension frame having a rear pivotal connection on said main frame, a rear truck having a drive shaft and front and rear vehicle wheels driven thereby, a universal bearing on opposite ends of said shaft, said main frame having opposite sides, and means for adjustably supporting each side of the rear of said main frame on one of said bearings, means for driving said cutter head, means for driving said drive shaft, and means for supporting the front of said main frame on an intermediate portion of said extension frame.

2. A concrete cutting machine according to claim 1, said means for driving said drive shaft comprising a motor on said main frame above said drive shaft and having a flexible driving connection with said drive shaft, said adjustable supporting means acting to adjust the slack of said driving connection.

3. A concrete cutting machine according to claim 1, said extension frame having opposite spaced sides, and a separate adjustable supporting means for each side of the front of said main frame and its said cutter head on one of the sides of said extension frame, said supporting means for each side of the front and rear of the main frame acting as a 4 point adjustable suspension for said cutter head.

4. A concrete cutting machine comprising a vehicle having a main frame having a cutter head, a support for said main frame, means for adjusting the vertical position of said main frame relative to said support comprising a bearing having an inner race fixed to said support and having an outer face, a housing having a universal connection to said outer race, said housing having a top, upright spaced slides arising from said top, said main frame having spaced upright devices each slidably housing one of said slides, a bracket fixed to the upper ends of said slides and an adjustable stop between said main frame and said bracket.

5. A concrete cutting machine according to claim 4, wherein said support acts as a drive shaft for said vehicle.

6. A concrete cutting machine according to claim 4, wherein said means for adjusting the vertical position of the main frame is provided at each side of the rear of said main frame, and wherein said support acts as a drive shaft for said vehicle.

7. In a vehicle-type, pavement-leveling machine, the combination of:
  (a) frame means having longitudinally spaced front and rear ends;
  (b) front wheel means connected to and supporting said frame means adjacent said front end thereof;
  (c) a rear wheel assembly connected to and supporting said frame means adjacent said rear end thereof;
  (d) rotary cutter means mounted on said frame means intermediate said front wheel means and said rear wheel assembly, and rotatable about a horizontal axis extending transversely of said frame means, for cutting a relatively wide and level path in pavement over which the machine runs;
  (e) said rear wheel assembly including two transversely spaced rear wheel frames each having two rear wheels rotatably mounted thereon in tandem;
  (f) means mounting said rear wheel frames on said frame means for independent pivotal movement of said rear wheel frames about a transverse horizontal axis intermediate said tandem rear wheels on said rear wheel frames to minimize any tendency of bumps in the pavement to cause said rear wheel assembly to move said rotary cutter means vertically; and
  (g) means interconnecting said frame means and said rear wheel frames for independently vertically adjusting said rear wheel frames relative to said frame means.

8. A vehicle-type, pavement-leveling machine as set forth in claim 7 including means interconnecting said frame means and the ends of said rotary cutter means for independently vertically adjusting the ends of said rotary cutter means relative to said frame means.

9. A vehicle-type, pavement leveling machine as set forth in claim 8 wherein said rotary cutter means is spaced forwardly from said rear wheel assembly a first longitudinal distance and said front wheel means is spaced forwardly from said rotary cutter means a second longitudinal distance which is large as compared to said first longitudinal distance so that any tendency of bumps encountered by said front wheel means to move said rotary cutter means vertically is reduced in proportion to the ratio of said first longitudinal distance to said second longitudinal distance, and said rear wheel assembly being behind and in line with said rotary cutter means and the transverse width of said rotary cutter means exceeding that of said rear wheel assembly so that said rear wheel assembly runs on the relatively wide and level path cut by said rotary cutter means to further minimize any tendency of bumps in the pavement to cause said rear wheel assembly to move said rotary cutter means vertically.

References Cited by the Examiner

UNITED STATES PATENTS

| | | | |
|---|---|---|---|
| 2,349,949 | 5/1944 | Farrell | 299—39 |
| 2,606,011 | 8/1952 | Lommen | 299—39 X |
| 3,063,690 | 11/1962 | Cornell | 299—39 |

ERNEST R. PURSER, *Primary Examiner.*

CHARLES E. O'CONNELL, *Examiner.*